(12) United States Patent
Lemke et al.

(10) Patent No.: US 9,568,029 B2
(45) Date of Patent: Feb. 14, 2017

(54) HYDRAULIC CYLINDER POSITION SENSING AND LOCKING SYSTEM AND CORRESPONDING METHOD

(75) Inventors: Austin R. Lemke, Madison, WI (US); Nathan A. Wille, Sun Prairie, WI (US)

(73) Assignee: Actuant Corporation, Menomonee Falls, WI (US)

( * ) Notice: Subject to any disclaimer, the term of this patent is extended or adjusted under 35 U.S.C. 154(b) by 867 days.

(21) Appl. No.: 13/995,198

(22) PCT Filed: Dec. 20, 2011

(86) PCT No.: PCT/US2011/065994
§ 371 (c)(1),
(2), (4) Date: Jun. 18, 2013

(87) PCT Pub. No.: WO2012/088019
PCT Pub. Date: Jun. 28, 2012

(65) Prior Publication Data
US 2013/0269511 A1  Oct. 17, 2013

Related U.S. Application Data

(60) Provisional application No. 61/426,281, filed on Dec. 22, 2010.

(51) Int. Cl.
*F15B 15/26* (2006.01)
*B66F 3/30* (2006.01)
*B66F 3/46* (2006.01)

(52) U.S. Cl.
CPC ................. *F15B 15/26* (2013.01); *B66F 3/30* (2013.01); *B66F 3/46* (2013.01); *F15B 15/261* (2013.01)

(58) Field of Classification Search
CPC . F15B 15/26; F15B 15/261; F15B 2015/1495; B66F 3/30; B66F 3/46
See application file for complete search history.

(56) References Cited

U.S. PATENT DOCUMENTS 1,709,000 A    4/1929   Bolens
2,412,414 A    12/1946  Mueller
(Continued)

FOREIGN PATENT DOCUMENTS

CN    2488681      5/2002
CN    101464124    6/2009
(Continued)

OTHER PUBLICATIONS

PCT International Search Report and Written Opinion for Application No. PCT/US2011/065994 dated Mar. 30, 2012 (13 pages).
(Continued)

*Primary Examiner* — Thomas E Lazo
*Assistant Examiner* — Abiy Teka
(74) *Attorney, Agent, or Firm* — Michael Best & Friedrich LLP

(57) ABSTRACT

The invention provides for a hydraulic cylinder position sensing and locking system that automatically maintains the position of a lock nut (36) that engages a plunger (16) on a hydraulic actuator such that if hydraulic pressure is lost, the lock nut prevents retraction of the plunger into the hydraulic cylinder (14). The hydraulic cylinder position sensing and locking system also provides for a position sensing feature that allows for the calculation of the axial stroke position of the plunger based on rotary movement of the lock nut. In addition, the invention provides for a synchronous hydraulic cylinder position sensing and locking system and methods of using both the hydraulic cylinder position sensing and locking system as well as the synchronous hydraulic cylinder position sensing and locking system.

32 Claims, 5 Drawing Sheets

(56) References Cited

U.S. PATENT DOCUMENTS

| | | | |
|---|---|---|---|
| 3,309,062 A | 3/1967 | Jansz | |
| 4,359,206 A | 11/1982 | McCreery | |
| 4,865,293 A | 9/1989 | Ishi et al. | |
| 4,886,244 A | 12/1989 | Renault | |
| 5,048,794 A | 9/1991 | Mamessier | |
| 5,524,868 A | 6/1996 | Decker et al. | |
| 5,681,029 A | 10/1997 | Reesor et al. | |
| 7,343,846 B2 * | 3/2008 | Stanford | B66F 3/30 92/18 |
| 2002/0079481 A1 | 6/2002 | Oxtoby | |
| 2008/0173013 A1 | 7/2008 | Hernandez et al. | |
| 2008/0277204 A1 * | 11/2008 | Moller | B66F 3/24 187/247 |

FOREIGN PATENT DOCUMENTS

| | | | | |
|---|---|---|---|---|
| FR | 2857000 | | 1/2005 | |
| FR | 2857000 A1 * | | 1/2005 | B66F 3/30 |
| JP | S50-84969 | | 7/1975 | |
| JP | 3003896 | | 1/1991 | |
| JP | H05-37891 | | 5/1993 | |
| JP | 3590662 | | 11/2004 | |

OTHER PUBLICATIONS

First Office Action from the Australian Intellectual Property Office for Application No. 2011349408 dated Oct. 15, 2015 (3 pages).
Notification of First Office Action and Search Report of the State Intellectual Property office of the People's Republic of China for Application No. 201180062211.2 dated Dec. 22, 2014 (13 pages).
Enerpac, Synchronous Lift Systems, 03-0399708-484_US, 2008, 8 pages.
PCT/US2015/043873 International Search Report and Written Opinion dated Jan. 14, 2016 (19 pages).
EP11817447.3 European Search Report and Written Opinion dated Sep. 28, 2016 (5 pages).

* cited by examiner

HYDRAULIC CYLINDER POSITION SENSING AND LOCKING SYSTEM AND CORRESPONDING METHOD

CROSS REFERENCE TO RELATED APPLICATIONS

This claims the benefit of U.S. Provisional Patent Application No. 61/426,281 filed Dec. 22, 2010, which is hereby incorporated by reference for all purposes.

STATEMENT OF FEDERALLY SPONSORED RESEARCH OR DEVELOPMENT

Not applicable.

FIELD OF THE INVENTION

The present invention relates to hydraulic cylinders and to methods of using the same. More specifically, the invention relates to a position sensing and locking system for hydraulic cylinders and methods of using the same.

BACKGROUND PRIOR ART

Hydraulic actuators, often referred to as hydraulic cylinders or hydraulic jacks, may be used for multiple applications. One typical application in which a hydraulic cylinder may be used is for lifting or lowering heavy loads such as bridges, structures, machinery, vehicles, rail cars, and large equipment. The loads may need to be raised for a variety of reasons such as performing maintenance on the load or repositioning the load. For most heavy loads, multiple hydraulic cylinders are employed to obtain the necessary amount of force and balance to lift the load.

Often, hydraulic cylinders are used not only as a lifting mechanism for these types of loads, but also as a support member once the loads are lifted. For example, a piece of heavy equipment may require maintenance and a technician may need to access the equipment from below in order to complete the necessary task. Once the equipment is lifted with the multiple hydraulic cylinders acting through hydraulic fluid under pressure, the hydraulic cylinders may also act as support members for holding up the heavy equipment. By using the hydraulic cylinders as support members, the technician may service the equipment from below.

Some mechanisms have been developed to provide a locking feature for the use of hydraulic cylinders as support members. One such mechanism includes using a lock nut to act as a stopping feature in the case of a loss of hydraulic pressure in the system due to a failure in one of the hydraulic cylinders, conduit for the hydraulic fluid, or the hydraulic pump. The lock nut may threadably engage a threaded portion of the plunger which axially extends from the piston of the hydraulic cylinder. When the plunger is raised by a supply of hydraulic fluid under pressure supplied to the hydraulic cylinder and the load has been lifted to the desired height, the lock nut may be turned down on the threaded plunger so that the lock nut is fixed relative to the hydraulic cylinder. In the event of a loss of hydraulic pressure to the system, the lock nut would prevent the plunger from retracting into the hydraulic cylinder, and thus, stops the load from lowering due to a loss of hydraulic pressure. Once the load no longer needs to be in the lifted position, personnel may then manually turn up the lock nut to the top of the plunger such that the lock nut does not prohibit the plunger from retracting into the hydraulic cylinder and the load may be lowered.

This system of manually turning a locknut, however, has several drawbacks. First, the hydraulic cylinder and load being lifted are not prevented from dropping due to a loss of hydraulic pressure until the lock nut is turned down by an individual. However, this task requires an individual to go below the load to turn down the lock nuts at the end of lifting, and to go back down to turn up the nuts before the load is capable of being lowered. Furthermore, the act of manually turning each lock nut may take a significant amount of time for an individual to perform in situations where multiple hydraulic cylinders are used to lift or lower a load.

Moreover, the load is at risk of damage while it is being lifted and lowered. Because the lock nut is not turned down on the plunger to prevent retraction of the plunger into the hydraulic cylinder until the load is lifted to its desired height, the load itself may be damaged if the hydraulic pressure is lost during the lifting process. Such a loss of pressure during the lifting of the load may result in the load being suddenly dropped from the hydraulic cylinder resulting in significant stress to the load. Similarly, because the lock nut is turned up to the top of the plunger to allow the plunger to retract into the hydraulic cylinder during the lowering process, a sudden loss of hydraulic pressure may result in the load being damaged as it is being lowered.

Even if the load does not fall from the support of a hydraulic cylinder during lifting or lowering of the load due to a loss of hydraulic pressure in one hydraulic cylinder, the load may still be damaged due to improper stress distributions resulting from a loss of support by that cylinder. For example, when a load is lifted or lowered by multiple hydraulic cylinders and hydraulic pressure fails in just one of the hydraulic cylinders, the load will still be supported by the remaining properly functioning hydraulic cylinders. Thus, the load will not be subject to damage from suddenly dropping, as in the case where hydraulic pressure is lost to multiple hydraulic cylinders. However, by not having adequate support on the load due to a loss of a support member, the load may still be damaged due to uneven stress distributions.

In fact, heavy loads that must be lifted with multiple hydraulic cylinders often need to be lifted by the hydraulic cylinders in a synchronous manner to avoid applying uneven stress to points of the load during lifting or lowering. To prevent such uneven stress on the load, synchronous lifting may need to be very precise to ensure that the hydraulic cylinders are not raising or lowering at different rates introducing undesired flexing in the load, as well as to ensure that appropriate balance is maintained on the load.

Consequently, a need exists for a hydraulic cylinder position sensing and locking system that allows for loads to be lifted, lowered, and supported in such a manner that avoids the disadvantages previously discussed.

SUMMARY OF THE INVENTION

The present invention addresses the aforementioned problems by providing a hydraulic cylinder position sensing and locking system that automatically maintains the position of a lock nut that engages a plunger on a hydraulic actuator such that if hydraulic pressure is lost, the lock nut prevents retraction of the plunger into the hydraulic cylinder. The hydraulic cylinder position sensing and locking system also provides for a position sensing feature that allows for the calculation of the axial stroke position of the plunger based on the rotary movement of the lock nut.

In one form, the present invention provides for a hydraulic cylinder position sensing and locking system, where the system includes a hydraulic actuator that includes a hydraulic cylinder and a plunger that includes a piston in the hydraulic cylinder and a threaded rod that extends axially from so as to move with the piston. The plunger is axially moveable relative to the cylinder in an extension direction and a retraction direction by selective supply of hydraulic fluid under pressure to the hydraulic cylinder. The system also includes a lock nut that rotatably engages the threaded rod with a threaded connection therebetween, a drive unit that can be operated to rotate the lock nut relative to the plunger, and a distance sensor that outputs a distance signal that is indicative of the axial spacing of the lock nut relative to the hydraulic cylinder. A controller also forms part of the system and is configured to receive the distance signal as an input and to output a control signal to control the drive unit so as to turn the lock nut in correspondence with the axial movement of the plunger so as to maintain the spacing of the lock nut relative to the hydraulic cylinder within a desired range.

In another form, the present invention provides for a hydraulic cylinder position sensing and locking system for a hydraulic actuator as described above that includes a lock nut on the threaded rod, where the system includes a distance sensor outputting a distance signal indicative of the axial spacing of the lock nut relative to the hydraulic cylinder, and a drive unit that can be operated to rotate the lock nut relative to the plunger. The system further includes a controller that receives as an input the distance signal and outputs a control signal to control the drive unit so as to turn the lock nut in correspondence with axial movement of the plunger so as to maintain the spacing of the lock nut relative to the hydraulic cylinder within a desired range.

The present invention also provides for a method of locking and sensing the position of a hydraulic cylinder. The method includes the steps of: providing a hydraulic actuator that includes a hydraulic cylinder and a plunger including a piston in the hydraulic cylinder and a threaded rod that extends axially from the piston so as to move with the piston, the plunger being moveable axially relative to the cylinder in an extension direction and a retraction direction by selective supply of hydraulic fluid under pressure. The method also includes providing a lock nut that rotatably engages the threaded rod with a threaded connection therebetween, providing a drive unit that can be operated to rotate the lock nut relative to the plunger, providing a distance sensor that outputs a distance signal that is indicative of the axial spacing of the lock nut relative to the hydraulic cylinder, and providing a controller that receives as an input the distance signal and outputs a control signal to control the drive unit. The method further includes programming the controller to provide the signal to control the drive unit such that the drive unit turns the lock nut in correspondence with the axial movement of the plunger so as to maintain the spacing of the lock nut relative to the hydraulic cylinder within a desired range.

In a different form, the present invention provides for a synchronous hydraulic cylinder position sensing and locking system. The synchronous system includes at least two hydraulic actuators, where each hydraulic actuator includes a hydraulic cylinder and a plunger having a piston in the hydraulic cylinder and a threaded rod that extends axially from so as to move with the piston, with the plunger being moveable axially relative to the cylinder in an extension direction and a retraction direction by selective supply of hydraulic fluid under pressure to the hydraulic cylinder. The synchronous system also includes a corresponding lock nut for each hydraulic actuator that rotatably engages the threaded rod with a threaded connection therebetween, a corresponding drive unit for each hydraulic actuator that can be operated to rotate the lock nut relative to the plunger, a corresponding distance sensor for each hydraulic actuator that outputs a distance signal that is indicative of the axial spacing of the lock nut relative to the hydraulic cylinder, a corresponding rotary position sensor for each hydraulic actuator that provides a signal indicative of rotary position of the drive unit, and a controller. The controller receives the signal from the rotary position sensor of each hydraulic actuator to determine the axial position of the plunger of each hydraulic actuator at least in part from the rotary position sensor signal. The controller maintains the difference between the axial positions of the plungers within a desired tolerance by selectively controlling the supply of hydraulic fluid under pressure to each hydraulic cylinder, and receives as an input the distance signal of each distance sensor. The controller outputs a control signal to control the corresponding drive units such that each drive unit turns the corresponding lock nut in correspondence with the axial movement of the corresponding plunger of each hydraulic actuator so as to maintain the spacing of each lock nut relative to the corresponding hydraulic cylinder within a desired range.

In yet another form, the present invention provides for a method of synchronously lifting or lowering a load with hydraulic actuators. The method includes providing at least two hydraulic actuators that each include a hydraulic cylinder and a plunger. The plunger includes a piston in the hydraulic cylinder and a threaded rod that extends axially from the piston so as to move with the piston. The plunger is moveable axially relative to the cylinder in an extension direction and a retraction direction by selective supply of hydraulic fluid under pressure to the hydraulic cylinder. The method also includes the steps of providing a corresponding lock nut for each hydraulic actuator that rotatably engages the threaded rod with a threaded connection therebetween, providing a corresponding drive unit for each hydraulic actuator that can be operated to rotate the lock nut relative to the plunger, and providing a corresponding distance sensor for each hydraulic actuator that outputs a distance signal that is indicative of the axial spacing of the lock nut relative to the hydraulic cylinder. A corresponding rotary position sensor is provided for each hydraulic actuator that provides a signal indicative of rotary position of the drive unit, and a controller is provided that receives as inputs the distance signal of each distance sensor and the rotary position sensor signal. Furthermore, the method includes programming the controller to determine the axial position of the plunger of each hydraulic actuator at least in part from the corresponding rotary position sensor signal to maintain the difference between the axial position of each plunger of the hydraulic actuators to stay within a desired tolerance by selectively controlling the supply of hydraulic fluid under pressure to each hydraulic cylinder and to output a signal to each drive unit to turn the corresponding lock nut in correspondence with axial movement of the corresponding plunger. The controller processes the inputs and produces outputs so as to maintain the spacing of the lock nut relative to the corresponding hydraulic cylinder within a desired range. Finally, the method includes operating the controller to synchronously lift or lower the load.

An advantage of the present invention is providing a locking system for a hydraulic cylinder that is automated, as well as the method of automating the same. Not only does the locking feature of the system engage upon a load being completely lifted to a desired height, but the locking system maintains the hydraulic cylinder in a locking position during all phases of lifting, supporting, and lowering the load.

Another advantage of the present invention is that the locking feature may be incorporated into a synchronous hydraulic cylinder system that can provide multiple hydraulic cylinders with a locking system simultaneously.

Yet another advantage realized by the present invention is a position sensing feature that determines the axial position of a plunger of a hydraulic actuator at least in part from the rotary position of the lock nut. The position sensing feature provides a controller with information regarding the displaced height of the load and the feature may be used in a synchronous lifting system that has multiple hydraulic actuators to ensure the load is lifted synchronously, i.e., each actuator is lifting at substantially the same rate to maintain the orientation of the load.

The foregoing and other objects and advantages of the invention will appear from the following description. In this description, reference is made to the accompanying drawings which form a part hereof and in which there is shown by way of illustration a preferred embodiment of the invention.

DETAILED DESCRIPTION OF THE PREFERRED EMBODIMENT

Figure 3:
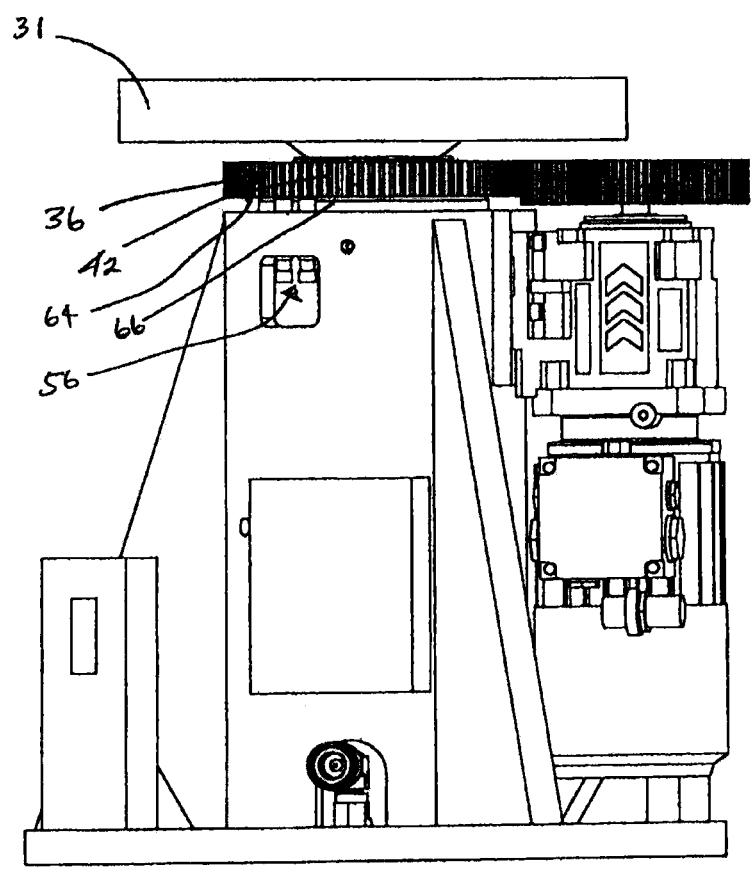
FIG. 3 is a front elevation view of the hydraulic cylinder position sensing and locking system of FIG. 2 with a load support attached to the top of the threaded plunger.
Figure 4:
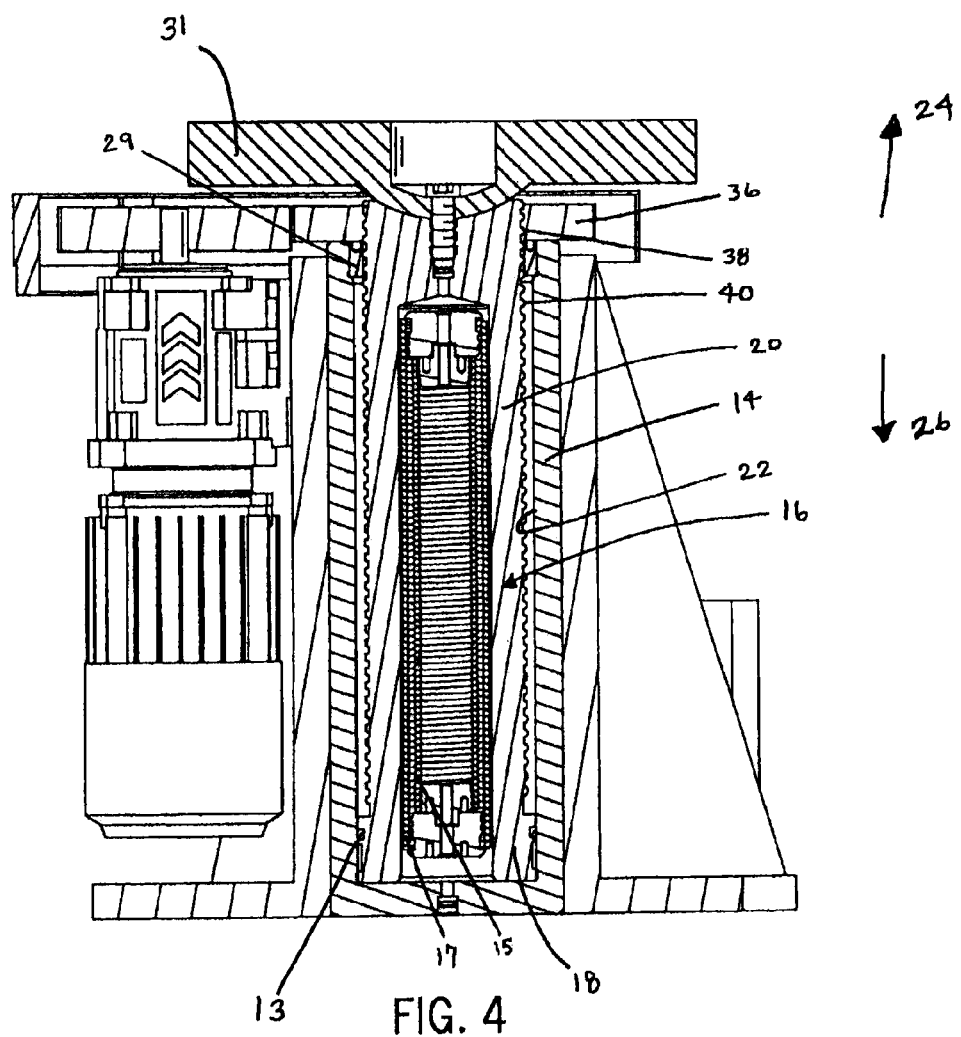
FIG. 4 is a partial section view of the hydraulic cylinder position sensing and locking system of FIG. 1.
Figure 5:
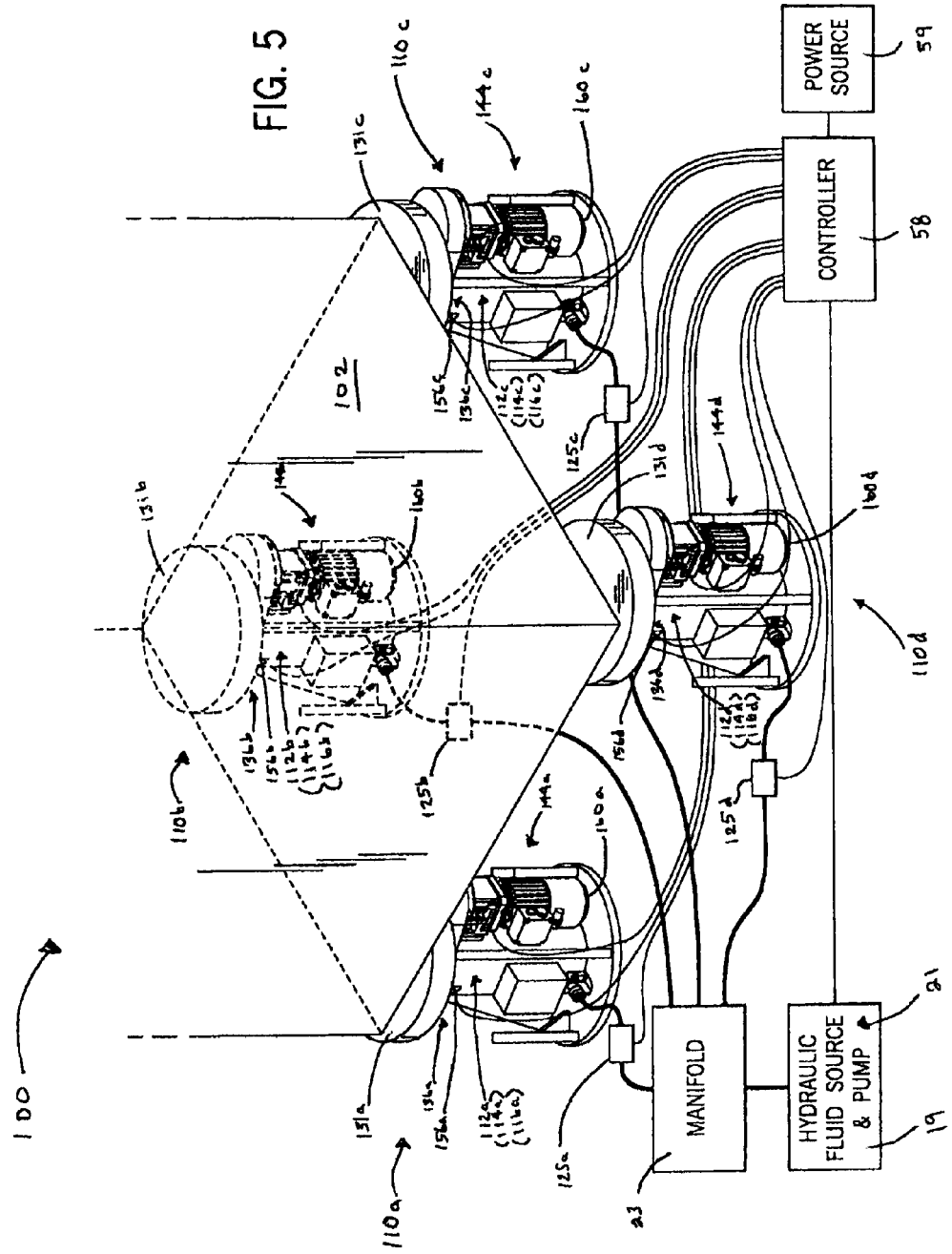
FIG. 5 is an isometric view of a synchronous hydraulic cylinder position sensing and locking system embodying the invention with hydraulic hoses shown in heavier lines than electrical wires.

Referring to FIGS. 1-5, a hydraulic cylinder position sensing and locking system 10 as well as a synchronous hydraulic cylinder position sensing and locking system 100 is shown. FIGS. 1-4 show several of the major components of a hydraulic cylinder position sensing and locking system 10, with some components of the system 10 only shown in FIG. 5 for purposes of clarity. FIG. 5 also shows a synchronous hydraulic cylinder position sensing and locking system 100. This description will begin with a discussion of a single hydraulic cylinder position sensing and locking system 10, as is mostly shown in FIGS. 1-4, before referring to the synchronous hydraulic cylinder position sensing and locking system 100.

The hydraulic cylinder position sensing and locking system 10 includes a hydraulic actuator 12 that includes a hydraulic cylinder 14 and a plunger 16 (as best seen in FIG. 4). The plunger 16 is disposed in the hydraulic cylinder 14 and includes a piston 18 and a threaded rod 20 that extends axially from the piston 18. The piston 18 forms a seal with the inner surface 22 of the hydraulic cylinder 14, and may include a sliding seal 13, such as an o-ring or other similar seal. This allows the plunger 16 to be moveable axially in an extension direction 24 and a retraction direction 26 when the hydraulic fluid under pressure is supplied to the hydraulic cylinder 14. The system 10 may also include a stop ring 29 disposed near the top of the hydraulic cylinder 14. The stop ring 29 may be screwed into the inner surface 22 of the hydraulic cylinder 14 and acts as a bearing for the plunger 16 as it extends from and retracts into the hydraulic cylinder 14, as well as provides support against side forces placed on the system 10. As seen in FIG. 4, the hydraulic actuator 12 may include springs 15, 17. The springs 15, 17 may help to retract the plunger 16 into the hydraulic cylinder 14 when the plunger 16 is axially moving in the retraction direction 26.

The hydraulic fluid under pressure may be stored in a hydraulic fluid source 19 that may include a pump 21, as shown in FIG. 5. Under user control, the pump 21 may provide hydraulic fluid under pressure to the hydraulic actuator 12. In its flow path, the hydraulic fluid under pressure may pass through a manifold 23, a control valve (125a-125d as shown in FIG. 5) and a port 27 to enter and exit the hydraulic cylinder 14.

The hydraulic actuator 12 may be placed within a hydraulic cylinder support 28 that may include a base 30, flanges 32, and an outer surface 34. The support 28 may help balance the system 10 and disperse compressive forces from loads that may be lifted, supported, or lowered by the system 10. As seen in FIGS. 3 and 4, a load support 31 that is connected to the plunger 16 may be employed for engaging a surface on a load. It can be appreciated that the load support 31 may be in different sizes and shapes than as shown in the corresponding figures and also may be comprised of various materials depending on the specific load to be lifted, lowered, or supported.

Figure 2:
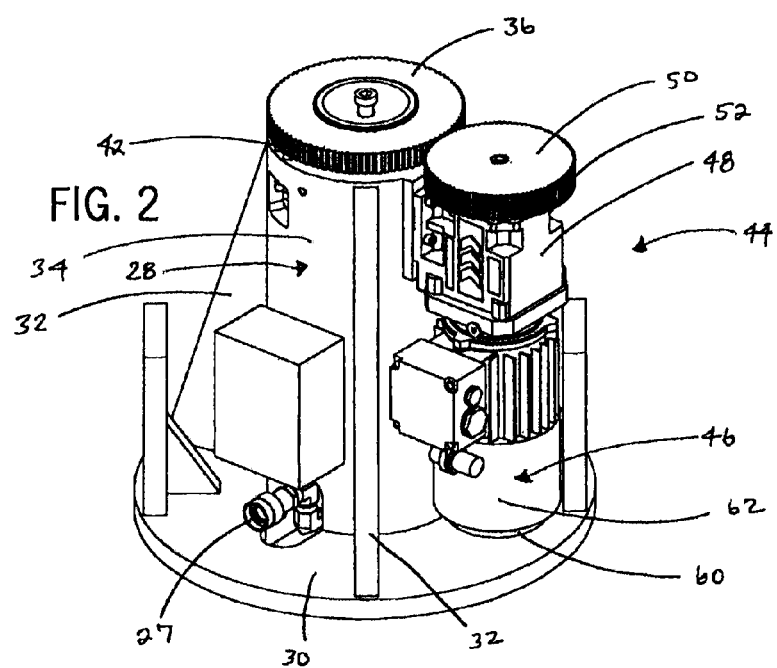
FIG. 2 is an isometric view of the hydraulic cylinder position sensing and locking system of FIG. 1 with a gear housing removed.

A lock nut 36 also forms part of the hydraulic cylinder position sensing and locking system 10. The lock nut 36 (as best seen in FIGS. 2-4) has internal threads on its interior surface 38 that match the threads on the exterior surface 40 of the threaded rod 20. This threaded engagement allows the lock nut 36 to move relative to the plunger 16 as the plunger 16 is extended or retracted from the hydraulic cylinder 14 and allows the lock nut 36 to stay in a nearly fixed spacing relationship with respect to the hydraulic cylinder 14, as will be discussed in further detail below. As seen in FIGS. 2 and 3, the lock nut 36 has gear teeth 42 on its exterior surface.

Figure 1:
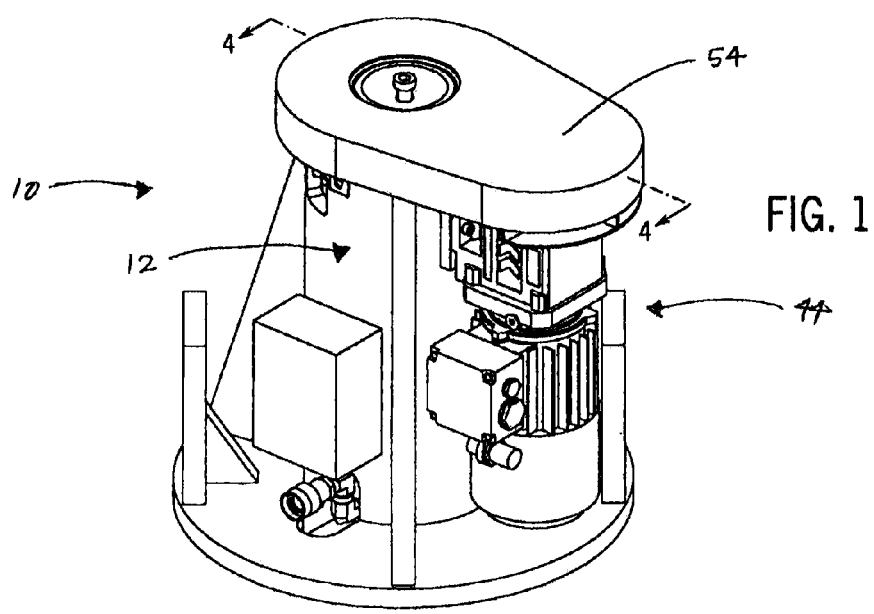
FIG. 1 is an isometric view of a hydraulic cylinder position sensing and locking system embodying the invention.

Also forming part of the system 10 is a drive unit 44. The drive unit 44 performs the function of maintaining the lock nut 36 within a desired distance range from the hydraulic cylinder 14, or other fixed surface, to protect against unintended retraction of the plunger 16 into the hydraulic cylinder 14 due to a loss of hydraulic pressure. As shown in FIG. 2, the drive unit 44 includes a motor 46, a gear reduction unit 48, a drive gear 50 with teeth 52, and the gear teeth 42 on the lock nut 36. The motor 46 preferably is a variable frequency drive ("VFD") motor, but may be another type of rotary motion device including, but not limited to, a hydraulic motor and air motors. As seen in FIGS. 2-4, the teeth 52 on the drive gear 50 mesh with the gear teeth 42 on the lock nut 36. A gear housing 54, as seen in FIG. 1, may cover this interaction between the lock nut 36 and the drive gear 50 to shield an operator from these moving parts. The gear housing 54 may also assist with keeping foreign particles from entering the hydraulic actuator 12, which may be detrimental to the sealing function of the hydraulic cylinder 14 and plunger 16.

Referring to FIG. 3, a distance sensor 56 also forms part of the hydraulic cylinder position sensing and locking system 10. The distance sensor 56 is able to output a distance signal that is indicative of the axial spacing between the lock nut 36 and the hydraulic cylinder 14. The distance sensor 56 is preferably an inductive distance sensor, but it will be appreciated that other types of distance sensors will adequately perform this function and include, but are not limited to, ultrasonic distance sensors, and infrared distance sensors.

A controller 58, which is not shown in FIGS. 1-4 for clarity purposes, but is displayed in FIG. 5, is another component of the hydraulic cylinder position sensing and locking system 10. The controller 58 is preferably a programmable logic controller (PLC). The controller 58, among other things, is configured to receive the distance signal from the distance sensor 56 and output a control signal to control the drive unit 44, as will be explained in further detail below. As such, the controller 58 is in electrical communication with the distance sensor 56 and the drive unit 44. Additionally, the controller 58 is also in electrical communication with the hydraulic fluid source 19, the pump 21, and the control valve (four control valves 125a-125d shown in FIG. 5) to control the selective supply of hydraulic fluid under pressure to the hydraulic cylinder 14. The controller 58 is connected to a power source 59, as seen in FIG. 5.

The hydraulic cylinder position sensing and locking system 10 may also include a rotary position sensor 60. The rotary position sensor 60 provides a signal to the controller 58 that is indicative of the rotary position of the drive unit 44. In the preferred embodiment shown, the rotary position sensor 60 is located within the housing 62 for the motor 46 and is a rotary position encoder, which may be a Hall effect encoder, that converts the angular position of an output shaft (not shown) of the motor 46 to an analog or digital signal. Accordingly, the rotary position sensor 60 must also be in electrical communication with the controller 58.

The locking feature of the hydraulic cylinder position sensing and locking system 10 functions as follows. Upon the operator's command to the controller 58 to extend or retract the plunger 16, the controller 58 selectively supplies hydraulic fluid under pressure to the hydraulic cylinder 14. When the plunger 16 extends or retracts from the hydraulic cylinder 14, the distance sensor 56 supplies a distance signal to the controller 58. The distance signal supplies the controller 58 with information that is indicative of the axial spacing between the lock nut 36 and the hydraulic cylinder 14. For example, the distance signal may contain information regarding the spacing between the bottom surface 64 of the lock nut 36 with the top surface 66 of the hydraulic cylinder 14 (as shown in FIG. 3). However, one skilled in the art will appreciate that the locking distance sensor 56 may be set up such that it provides the controller 58 with a distance signal containing information for the spacing between the bottom surface 62 of the lock nut 36 with a fixed portion of the hydraulic cylinder support 28 or other surface that would contact the lock nut 36 in the event of a loss of hydraulic pressure such that the lock nut 36 would prevent the plunger 16 from retracting into the hydraulic cylinder 14.

The controller 58 is programmed to receive the distance signal as an input and to provide a control signal to the drive unit 44 to proportionally control the lock nut 36 such that a desired range of spacing is maintained between the lock nut 36 and the hydraulic cylinder 14, as will be described in more detail below. Depending on whether the plunger 16 is moving in the extraction direction 24 or the retraction direction 26, the control signal to the drive unit 44 will vary in which direction the control signal communicates the drive unit 44 to rotate the lock nut 36. For example, when the plunger 16 is axially moving from the hydraulic cylinder 14 in the extension direction 24, the lock nut 36 is "turned down" by the drive unit 44. If the threaded rod 20 has threads in a right hand direction, the lock nut 36 must be turned in a clock-wise direction by the drive gear 50, and thus, the drive gear 50 must be driven by the motor 46 and gear reduction unit 48 in a counter-clockwise direction.

Conversely, in the circumstance where the plunger 16 is being retracted into the hydraulic cylinder 14 to lower a load, the lock nut 36 must be "turned up" by the drive unit 44 to maintain its desired spacing with the hydraulic cylinder 14. Assuming the same right hand direction threading pattern is on the threaded rod 20, the controller 58 provides a control signal to the drive unit 44 to turn the lock nut 36 in a counter-clockwise direction to "turn up" the lock nut 36 such that axial spacing of the lock nut 36 to the hydraulic cylinder 14 is maintained within the desired range as the plunger 16 is being retracted into the hydraulic cylinder 14. In this situation, the drive gear 50 must be driven by the motor 46 and gear reduction unit 48 in a clock-wise direction.

The desired range of spacing between the lock nut 36 and the hydraulic cylinder 14 may be set at different values, however, it is preferable to have the desired range be a small value, such as between about one to about six millimeters, such that the effects of a sudden loss of hydraulic pressure to the system 10 will be minimized. If the axial spacing between the lock nut 36 and the hydraulic cylinder 14 is maintained at a small distance and hydraulic pressure fails during the lifting or lowering of an object, the plunger 16 would only move a minimal distance due to the loss of pressure. Because the load would only be subjected to a small movement in such a circumstance, the load may be protected from damage throughout the lifting and lowering process.

Furthermore, the locking feature of the system 10 also incorporates a stopping feature upon the hydraulic actuator 12 reaching its desired stroke in the extension direction 24. The desired stroke of the hydraulic actuator 12 may be the full stroke of the plunger 16, or some lesser extension. Once the plunger 16 has reached the point in its extension to which lifting has stopped, the controller 58 is programmed to provide a control signal to the drive unit 44 to turn down the lock nut 36 such that the lock nut 36 seats against retraction of the plunger 16. This is accomplished by turning down the lock nut 36 until the lock nut 36 may not be turned down any further, by either contacting the top surface 66 of the hydraulic cylinder 14 or any other fixed surface that would prevent the plunger 16 from retracting into the hydraulic cylinder 14. Because the lock nut 36 is automatically turned down by the system 10, an operator or technician does not need to walk or crawl under the object to manually turn down the lock nut as in past systems.

Moreover, the system 10 may be programmed with a continuous stopping feature. The controller 58 is programmed such that any time the plunger 16 stops extending or retracting from the hydraulic cylinder 14, the controller 58 outputs a control signal to the drive unit 44 to turn down the lock nut 36 such that it seats against retraction of the plunger 16 into the hydraulic cylinder 14. This feature may be desirable for situations where an individual desires to raise or lower a load with stopping points at intermediate extension or retraction levels of the plunger 16, or if the individual stops the lifting or lowering process for some reason before completion of the lifting or lowering. Again, this feature provides the benefit of automatically turning down the lock nut 36 such that an individual would not have to do so and place himself or herself under the load.

Alternatively, the locking feature or the continuous stopping feature as described above may incorporate a different sequence of operation. When the hydraulic actuator 12 stops moving in the extension direction 24, either from the plunger 16 being fully extended or the operator stopping the extension of the plunger 16, the controller 58 is programmed to provide a control signal to the drive unit 44 to turn down the lock nut 36 such that the lock nut 36 is spaced a distance from the hydraulic cylinder 14, rather than completely turning down the lock nut 36 such that it seats against retraction of the plunger 16 into the hydraulic cylinder 14. The spacing between the lock nut 36 and the hydraulic cylinder 14 may be about one millimeter, however, the controller 58 may be programmed to turn down the lock nut 36 such that the spacing is set at a different distance. Then, the controller 58 selectively supplies hydraulic fluid under pressure to the hydraulic cylinder 14 through communication with the control valve to lower the plunger 16 such that the lock nut 36 seats against retraction of the plunger 16.

Now, the position sensing feature of the hydraulic cylinder position sensing and locking system 10 will be described. As discussed above, the rotary position sensor 60 provides a signal to the controller 58 that is indicative of the rotary position of the drive unit 44. From this rotary position signal, the controller 58 may be programmed to determine the axial position of the plunger 16. The controller 58 may do so by being programmed with the ratio of the gear reduction unit 48 (i.e. the gear reduction ratio between the output shaft of the motor 46 and the output shaft of the gear reduction unit 48), the gear ratio between the drive gear 50 and the lock nut 36, and the pitch of the threaded rod 20. With this information, the controller 58 may be programmed to calculate the axial position of the plunger 16 based on the rotary position signal which provides information related to the angular position of the drive unit 44, specifically the motor 46, and as a refinement with the distance signal from the distance sensor 56, as discussed below.

The gear reduction unit 48 that is used as part of the position sensing function of the system 10 provides a more accurate position calculation. Requiring the output shaft of the motor 46 to turn at a higher angular speed than the output shaft of the gear reduction unit 48 results in each revolution of the output shaft of the motor 46 being equivalent to a smaller axial distance of the plunger 16, and thus, the calculation of the axial position of the plunger 16 by the controller 58 will be more precise.

To obtain an even more accurate calculation for the axial position of the plunger 16, the hydraulic cylinder position sensing and locking system 10 may be configured to also use the distance signal from the distance sensor 56 when calculating the axial position of the plunger 16. The distance signal will be used in the axial position calculation to compensate for angular movement of the output shaft of the motor 46 that occurs, but does not correspond to axial movement of the plunger 16.

For example, before the system 10 begins to lift an object by extending the plunger 16, the control 58 may be programmed to turn up the lock nut 36 on the threaded rod 20 to relieve any pressure between the lock nut 36 and the hydraulic cylinder 14, or other surface upon which the lock nut 36 was seated. It may be the case that before the lock nut 36 can be turned up the cylinder 14 may need to be pressurized to relieve the friction on the nut 36 to unseat the nut 36 in case the hydraulic system has leaked or relaxed and the nut 36 is prohibited from being rotated or turned up by friction. In turning up the lock nut 36, the rotary position sensor 60 sends a rotary position signal to the controller 58, however, this rotary motion does not correspond to axial movement of the plunger 16. The same is true in situations where the lock nut 36 is turned down on the threaded rod 20 to be seated against retraction of the plunger 16 (e.g. when the plunger 16 has reached a full stroke in the extension direction 24). Thus, the distance signal from the distance sensor 56 may be used by the controller 58 to compensate for axial movement of the lock nut 36 on the plunger 16 that does not correspond to axial movement of the plunger 16.

A method of locking and sensing the position of a hydraulic cylinder is discussed below. The method includes first providing a hydraulic actuator 12, a lock nut 36, a drive unit 44, a distance sensor 56, and a controller 58 as discussed above. The controller 58 is then programmed to provide the distance signal to control the drive unit 44 such that the drive unit 44 turns the lock nut 36 in correspondence with the axial movement of the plunger 16 so that the spacing of the lock nut 36 relative to the hydraulic cylinder 14 is maintained within a desired range. As previously mentioned, this desired range may be about one millimeter to about six millimeters.

The controller 58 maintains the spacing of the lock nut 36 relative to the hydraulic cylinder 14 within a desired range by performing a feedback process with the distance sensor 56 and the drive unit 44 that involves proportional control of the lock nut 36 with the drive unit 44. The controller 58 is programmed with a command position for the lock nut 36 and receives distance signals as inputs, which provide an actual position of the lock nut 36. The controller 58 is further programmed to send control signals to the drive unit 44 as outputs to proportionally control the actual position of the lock nut 36. The controller 58 does so by calculating the difference between the command position and the actual position of the lock nut 36 and multiplying that difference by a gain to send a control signal to the drive unit 44 to control the position of the lock nut 36. Thus, the controller 58 is programmed to output a control signal to the drive unit 44 (specifically the variable frequency drive motor 46) that is proportional to the difference between the command position and actual position of the lock nut 36. In the circumstance where the actual position of the lock nut 36 is greater than the upper bound of the desired range, the controller 58 may be programmed to briefly stop movement of the plunger 16 to allow the drive unit 44 to drive the lock nut 36 back within the desired range of spacing relative to the hydraulic cylinder 14. This feedback loop is continued until the user indicates to the controller 58 to stop lifting or lowering the load 102.

Other steps may be added to this method as well. For example, a rotary position sensor 60 may be provided and be configured to provide a signal to the controller 58 indicative of the rotary position of the drive unit 44, as previously described. The controller 58 may also be further programmed to determine the axial position of the plunger 16 at least in part from the rotary position signal. As previously described, the controller 58 may also be programmed to determine the axial position from the distance signal as well to achieve a more precise determination.

Additionally, the controller 58 may be programmed to perform other operations in response to certain conditions.

For example, the controller 58 may be further programmed such that, upon a stoppage of movement of the plunger 16, the controller 58 provides a signal to the drive unit 44 such that the drive unit 44 continues to turn the lock nut 36 such that the lock nut 36 seats against retraction of the plunger 16 into the hydraulic cylinder 14. As previously described with respect to the locking feature and continuous stopping feature, the controller 58 may also be programmed such that upon a stoppage of movement of the plunger 16, the controller 58 provides a signal to the drive unit 44 such that the drive unit 44 will turn the lock nut 36 such that the lock nut 36 is spaced a distance from the hydraulic cylinder 14. This distance between the lock nut 36 and the hydraulic cylinder 14 may be set to be approximately one millimeter, however, the controller 58 may be programmed such that a different distance may be achieved. The controller 58 is further programmed to selectively supply hydraulic fluid under pressure to the hydraulic cylinder 14 to lower the plunger 16 such that the lock nut 36 seats against retraction of the plunger 16 into the hydraulic cylinder 14.

This feature of driving the lock nut 36 to a certain spacing relative to the hydraulic cylinder 14 and then lowering the plunger 16 into the hydraulic cylinder 14 is preferable to automatically turning the lock nut 36 such that it seats against retraction of the plunger 16 into the hydraulic cylinder 14. As will be discussed in more detail below, the controller 58 may be programmed to selectively supply hydraulic fluid under pressure to the hydraulic cylinder 14 before rotating the lock nut 36 to unseat the lock nut 36 after the lock nut 36 has been seated against retraction of the plunger 16. If the plunger 16 had stopped because it reached a full stroke in the extension direction 24, the plunger is not able to be lifted any further by supply of hydraulic fluid under pressure to the hydraulic cylinder 14. As such, the drive unit 44 may not have sufficient torque to turn up the lock nut 36 to unseat the lock nut 36 so that the lowering process may be started. For this reason, the feature of driving the lock nut 36 to a certain spacing relative to the hydraulic cylinder 14 and then lowering the plunger 16 into the hydraulic cylinder 14 is preferred. In fact, because the controller 58 is constantly calculating the extension length of the plunger 16 based on the rotary position signal, and possibly the distance signal, the controller 58 may be programmed such that when the plunger 16 reaches its full stroke in the extension direction 24, the controller 58 sends a control signal to the drive unit 44 to turn down the lock nut 36 to a certain distance from the hydraulic cylinder 14.

As briefly discussed above, the controller 58 may be programmed such that before rotating the lock nut 36 to unseat the lock nut 36, the controller 58 selectively supplies hydraulic fluid under pressure to the hydraulic cylinder 14 to relieve any friction on the lock nut 36 that may prevent rotating of the lock nut 36 by the drive unit 44. In addition, the controller 58 may be programmed such that prior to any movement of the plunger 16 in the retraction direction 26, the controller 58 provides a signal to the drive unit 44 such that the drive unit 44 turns the lock nut 36 such that the lock nut 36 moves out of being seated against retraction of the plunger 16.

While a hydraulic cylinder position sensing and locking system 10 has been described in detail and contains one hydraulic actuator 12, most often it is the case that loads must be lifted by multiple hydraulic actuators 12 to obtain the proper amount of force and balance to lift the load. Thus, a synchronous hydraulic cylinder position sensing and locking system 100 is shown in FIG. 5 and is described below.

As seen in FIG. 5, a synchronous hydraulic cylinder position sensing and locking system 100 is shown to synchronously lift a load 102. The synchronous hydraulic cylinder position sensing and locking system 100 contains many of the same features of the hydraulic cylinder position sensing and locking system 10. The synchronous system 100 as shown in FIG. 5 is composed of four hydraulic cylinder position sensing and locking systems 110a, 110b, 110c, 110d, that include the same features as the hydraulic position sensing and locking system 10 as described above. As such, there are four hydraulic actuators 112a-112d, four corresponding lock nuts 136a-136d, four corresponding drive units 144a-144d, and four corresponding distance sensors 156a-156d. The synchronous hydraulic cylinder position sensing and locking system 100, however, also has four corresponding rotary position sensors 160a-160d on the corresponding drive units 144a-144d, as will be explained in greater detail below. In this example, four individual systems 110a-110d combine to make up the synchronous system 100. However, it can be appreciated that a synchronous system 100 is such a system that contains two or more individual hydraulic cylinder position sensing and locking systems 10.

Each individual system 110a-110d is supplied with hydraulic fluid under pressure from a hydraulic fluid source 19 and pump 21. The hydraulic fluid passes through a manifold 23 and control valves 125a-125d, before passing to the individual systems 110a-110d. Just as previously described for the individual hydraulic cylinder position sensing and locking system 10, the synchronous system 100 is set up such that the hydraulic fluid source 19 and pump 21 are in electrical communication with the controller 58. Moreover, each control valve 125a-125d, each drive unit 144a-144d, each distance sensor 154a-154d, and each rotary position sensor 160a-160d for each individual hydraulic cylinder position sensing and locking system 110a-110d are also in electrical communication with the controller 58.

The individual components of the synchronous hydraulic cylinder position sensing and locking system 100 function the same as described above with respect to the hydraulic cylinder position sensing and locking system 10, except as noted below.

The controller 58 in the synchronous system 100 is further programmed to provide synchronous lifting between all the individual systems 110a-110d. The synchronous lifting feature is programmed into the controller 58 and relies on the position sensing feature of each individual system 110a-110d. To keep the load 102 being lifted or lowered in a synchronous fashion, the controller 58 receives the rotary position signal from the rotary position sensor 160a-160d of each individual system 110a-110d as previously discussed with respect to the hydraulic position sensing and locking system 10, and is programmed to maintain the difference between the axial positions of the plungers 116a-116d of each individual system 110a-110d within a desired tolerance. This is done by selectively controlling the supply of hydraulic fluid under pressure that flows to each hydraulic cylinder 114a-114d.

To obtain a more accurate position calculation, the controller 58 may also be programmed to determine the axial position of the plungers 116a-116d of each hydraulic actuator 112a-112d by also incorporating the distance signal from the distance sensor 160a-160d of each system 110a-110d. Just as described above with respect to the hydraulic cylinder position sensing and locking system 10, incorporating the distance signal to compensate for movement of the locknuts 136a-136d that do not correspond to axial movement of the corresponding plungers 116a-116d provides a more accurate axial position calculation for the plungers 116a-116d. As a result, a more accurate synchronous lifting or lowering of the load 102 may be obtained. In fact, the desired tolerance for the difference between the axial positions of the plungers 116a-116d may be as precise as 0.040 inches.

Just as described above with respect to the hydraulic position sensing and locking system 10, the controller 58 in the synchronous hydraulic cylinder position sensing and locking system 100 is also programmed to control the position of each lock nut 136a-136d to maintain individual system 110a-110d in a stopped position on the threaded rod 20 of each plunger 116a-116d. The advantages of such a system and the processes of doing so are the same as previously described, except for the fact that the controller 58 electrically communicates with multiple hydraulic position sensing and locking systems 110a-110d at the same time.

A method of synchronously lifting or lowering a load 102 with hydraulic actuators includes first providing at least two hydraulic actuators 112a-112d, corresponding lock nuts 136a-136d, corresponding drive units 144a-144d, corresponding distance sensors 156a-156d, corresponding rotary position sensors 160a-160d, and a controller 58, as described above.

The controller 58 is then programmed to perform several functions. The controller 58 is programmed to determine the axial position of the plungers 116a-116d at least in part from the rotary position signals from the corresponding rotary position sensors 160a-160d and from the signals from the distance sensors 156a-156d, by the process as previously described. The controller 58 is also programmed to maintain the difference between the axial position of each plunger 116a-116d of the hydraulic actuators 112a-112d to stay within a desired tolerance of the position of the other plungers by selectively controlling the supply of hydraulic fluid to each hydraulic cylinder 114a-114d through communication with the corresponding control valves 125a-125d. The controller is also programmed to output a control signal to each drive unit 144a-144d to turn the corresponding lock nut 136a-136d in correspondence with the axial movement of the corresponding plunger 116a-116d so as to maintain the spacing of the lock nuts 136a-136d relative to their corresponding hydraulic cylinder 114a-114d.

The controller 58 may then be run to synchronously lift or lower a load 102 by selectively supplying hydraulic fluid under pressure to the hydraulic actuators 112a-112d based on control signals from the controller 58. To do so, the controller 58 performs a feedback process to calculate and adjust the position of each plunger 116a-116d to remain within a desired tolerance. Whether the load 102 is being lifted or lowered, the rotary position sensors 160a-160d send rotary position signals to the controller 58 and the controller 58 calculates the axial positions of the plungers 116a-116d and compares the difference in the axial positions between the plungers 116a-116d. If a plunger's position is such that the difference between its position and the other plungers' position is within a desired tolerance, then the controller 58 will send a control signal to the control valve for that plunger such that the rate of supply of hydraulic fluid under pressure will be maintained to that hydraulic cylinder. However, if a plunger is at an axial position such that the difference between its position and the other plungers' positions is outside a desired tolerance, then the controller 58 will send one of two signals: (1) if the plunger is positionally advanced in the direction of movement in comparison to the other plungers, then the controller will send a signal to the corresponding control valve to selectively decrease the rate of change of hydraulic fluid flow supplied to the corresponding hydraulic cylinder, or (2) if the plunger is positionally behind in the direction of movement in comparison to the other plungers, then the controller will send a signal to the corresponding control valve to selectively increase the rate of change of hydraulic fluid flow supplied to the corresponding hydraulic cylinder. This feedback process continues through the synchronous lifting or lowering of the load 102.

While the controller 58 is completing this synchronization feedback process, the controller 58 is also performing the feedback process to maintain the lock nuts 136a-136d of each hydraulic actuator 112a-112d within a desired range of the corresponding hydraulic cylinders 114a-114d. This feedback process is completed for multiple hydraulic actuators 112a-112d just as described above for one hydraulic actuator 12.

The method for synchronously lifting or lowering a load with hydraulic actuators 112a-112d may also include further steps by further programming the controller 58 to perform other operations in response to certain conditions. For example, the controller 58 may be further programmed to incorporate the locking feature and the continuous stopping feature as previously discussed. For example, the controller 58 may be programmed such that upon any one of the plungers 116a-116d reaching its full stroke in either the extension direction 24 or the retraction direction 26, the controller 58 stops the axial movement of all of the other plungers 116a-116d. The controller 58 may be programmed to determine that one or more of the plungers 116a-116d have reached a full stroke when the controller 58 receives feedback from a rotary position sensor 160a-160d that one of the drive units 144a-144d is not turning, despite the controller 58 communicating to corresponding control valve to continue the rate of change of flow of hydraulic fluid under pressure to the corresponding hydraulic cylinder. At that point, the controller 58 communicates with the control valves 125a-125d to stop the rate of change of flow of hydraulic fluid under pressure to all of the hydraulic cylinders 114a-114d. A stop in axial movement of all of the plungers 116a-116d may also arise through the operator's control of the system 100, as will be discussed below. In either event, once all of the plungers 116a-116d have stopped axial movement, the controller 58 may be programmed to provide a signal to the drive units 144a-144d such that the drive units continue to turn the corresponding lock nuts 136a-136d such that the lock nuts seat against retraction of the plungers 116a-116d into the corresponding hydraulic cylinder 114a-114d.

However, the controller 58 may also be programmed such that upon a stoppage of movement of all of the plungers 116a-116d, the controller 58 performs a locking feature or a continuous stopping feature that takes into consideration any differences in extension or retraction of the individual plungers 116a-116d during the lifting or lowering of the load 102 by the synchronous system 100, and adjusts the lock nuts 36 accordingly before lowering the plungers 116a-116d such that the lock nuts 136a-136d seat against retraction of the plungers 116a-116d into the hydraulic cylinders 114a-114d. To do so, the controller 58 must determine the lengths of extension or retraction of all of the plungers 116a-116d during the synchronous lift or synchronous lowering of the load 102. The controller 58 does so by calculating an initial position of each of the plungers 116a-116d and a stopping position of each of the plungers 116a-116d, which may be completed by use of the rotary position signals and the distance signals for each hydraulic actuator 112a-112d. The controller 58 must then take into consideration if the system 100 was lifting or lowering the load 102 prior to the stopping of all of the plungers 116a-116d.

If the system 100 was lifting the load in the extension direction 24, the controller 58 is then programmed to provide a signal to the drive unit of the hydraulic actuator with the plunger that had extended the least from an initial position to a stopping position relative to the other plungers. That drive unit will turn the corresponding lock nut such that the lock nut is spaced a certain distance from the corresponding hydraulic cylinder. As discussed above, this distance between the lock nut and the hydraulic cylinder may be set to be approximately one millimeter, however, the controller 58 may be programmed such that a different distance may be achieved. The controller 58 is further programmed to send a control signal to the other drive units such that the other drive units turn the corresponding lock nuts such that the spacing of each lock nut relative to the corresponding hydraulic cylinder is adjusted to compensate for any difference in the extension of the plungers relative to the plunger that extended the least.

For example, if one of the plungers had extended one millimeter more than the plunger that extended the least, the controller 58 would provide a signal to the drive unit with the further extended plunger to turn the lock nut associated with that plunger such that the spacing between that lock nut and the hydraulic cylinder was set to a distance which equals the certain distance of spacing between the lock nut and the hydraulic cylinder for the plunger that extended the least plus the additional one millimeter. This would provide the further extended plunger with a greater distance between its lock nut and its hydraulic cylinder, thus compensating for the difference between the length of extension from the initial position to the stopping position of the two plungers during the synchronous lift. The controller 58 is programmed do the same for each of the hydraulic actuators 112a-112d in the synchronous system 100, setting the distance of each of the lock nuts to the corresponding hydraulic cylinders based on the difference in the extension of the individual plungers relative to the plunger that extended the least.

The controller 58 is further programmed to selectively supply hydraulic fluid under pressure to all of the hydraulic cylinders 114a-114d to lower the plungers 116a-116d such that the lock nuts 136a-136d seat against retraction of the plungers 116a-116d into the hydraulic cylinders 114a-114d.

This feature of individually adjusting the spacing between the lock nuts 136a-136d and the hydraulic cylinders 114a-114d for any difference in extension during the synchronous lift before lowering the plungers 116a-116d ensures that the load 102 will be placed in an orientation that is very similar to the orientation of the load 102 before the lift began.

If the system 100 was lowering the load 102 in the retraction direction 26 prior to the stopping of all of the plungers 116a-116d, the controller 58 may be programmed to perform a very similar compensating process for the spacing of the lock nuts 136a-136d to the hydraulic cylinders 114a-114d before lowering the plungers 116a-116d such that the lock nuts 136a-136d seat against retraction of the plungers 116a-116d into the hydraulic cylinders 114a-114d. However, instead of determining which plunger 116a-116d had retracted the least and adjusting the corresponding lock nut to a certain distance as described above for when the load 102 was being lifted, the controller 58 determines which plunger 116a-116d had retracted the most from an initial position to a stopping position relative to the other plungers of the system 100, and provides a control signal to the corresponding drive unit to turn that lock nut such that the spacing of the lock nut relative to the corresponding hydraulic cylinder is at a certain distance. The controller 58 then performs the compensating process for each of the remaining lock nuts just as described above, setting the distance between each of the lock nuts and the corresponding hydraulic cylinders to compensate for any difference between the retraction of each individual plunger relative to the retraction of the plunger that extended the most. The controller 58 is programmed to then selectively supply hydraulic fluid under pressure to the hydraulic cylinder 114a-114d of each hydraulic actuator to lower each of the plungers 116a-116d such that each of the lock nuts 136a-136d seats against retraction of the corresponding plunger 116a-116d. Again, this compensating feature provides that the lowered load 102 will be placed in an orientation that is very similar to the orientation of the load 102 before the synchronous lowering began.

In addition, the controller 58 may be programmed such that prior to any movement of any of the plungers 116a-116d in the retraction direction 26, the controller provides a signal to the corresponding drive units 144a-144d such that the drive unit turns the corresponding lock nuts 136a-136d such that the lock nuts move out of being seated against retraction of the plungers 116a-116d. The controller 58 may also be programmed to pressurize the hydraulic cylinders 114a-114d before turning the lock nuts 136a-136d to unseat the lock nuts 136a-136d, thus relieving friction on the lock nuts 136a-136d that may be built up from a leak in the hydraulic system or if the system has relaxed and that would prevent the lock nuts 136a-136d from being rotated.

Figure 6:
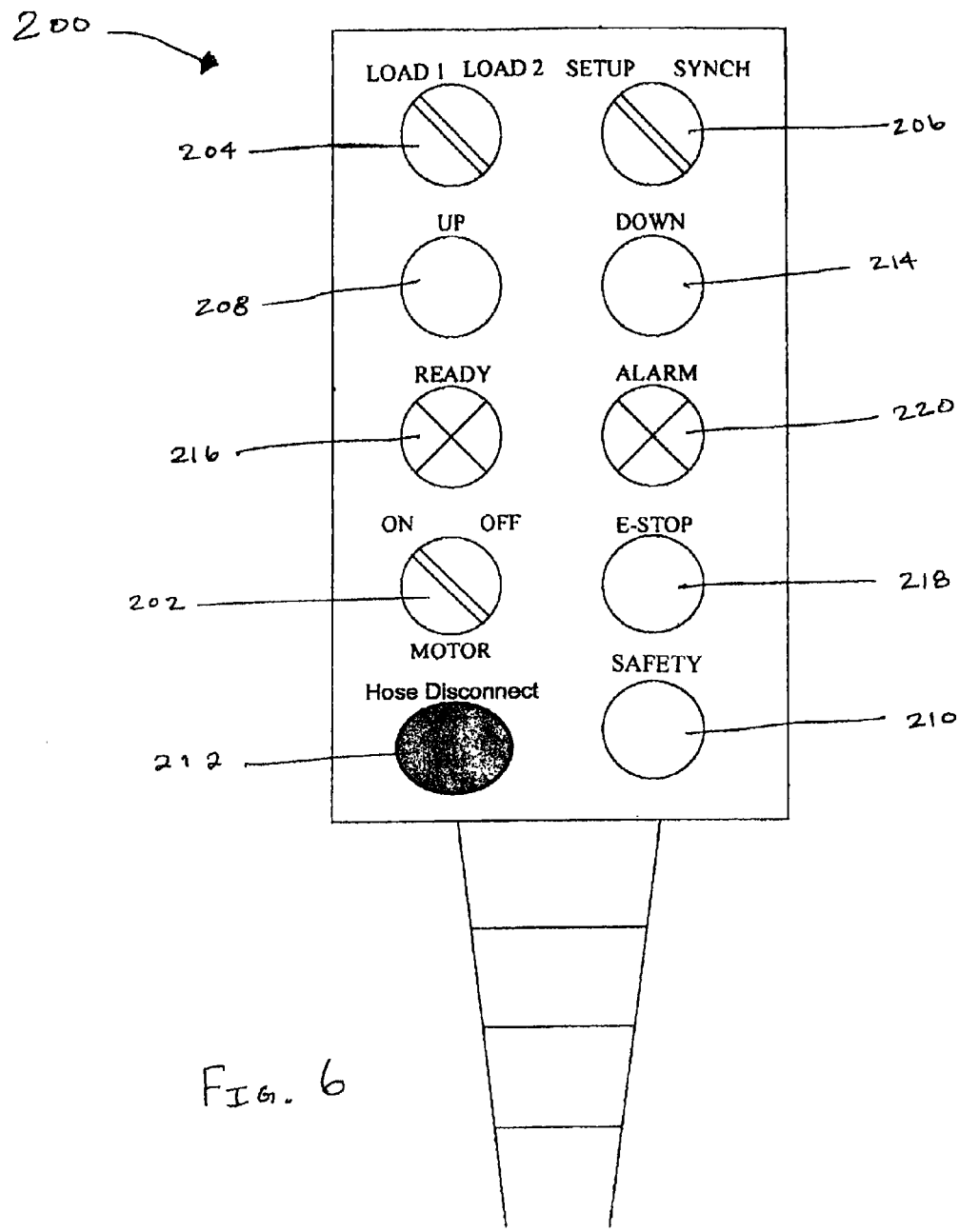
FIG. 6 is a top plan view of a pendant used to operate a synchronous hydraulic cylinder position sensing and locking system embodying the invention.

Referring now to FIG. 6, a pendant 200 is shown. The pendant 200 is connected to the controller 58 and may be used by an operator for synchronously lifting or lowering a load 102 with a synchronous hydraulic cylinder position sensing and locking system 100, such as the system 100 shown in FIG. 5. Specifically, modes of lifting and lowering a load 102 with the pendant 200 will now be described.

To lift a load 102, an operator first provides power to the synchronous hydraulic cylinder position sensing and locking system 100 from the power source 59. The operator then turns on the pump 21 to pressurize the synchronous system 100 by turning switch 202 to "ON." At this point, the controller 58 validates electrical communication with the hydraulic fluid source 19 and pump 21, as well as the drive units 144a-144d, the distance sensors 156a-156d, the rotary position sensors 160a-160d, and the control valves 125a-125d for each of the individual hydraulic position sensing and locking systems 110a-110d. Once this validation is complete, the "READY" indicator 216 lights up and remains lit.

As seen by switch 204 in FIG. 6, the pendant 200, and associated synchronous system 100, may be configured for lifting or lowering different loads. In the embodiment shown in FIG. 6, switch 204 allows an operator to configure the system 100 to lift a "LOAD 1" or a "LOAD 2." These loads may vary in characteristics such that different size hydraulic cylinders 114a-114d may be employed to lift or lower the corresponding load. In FIG. 6, switch 204 is shown as selecting "LOAD 1."

Once the load is selected by switch 204, the synchronous system 100 configures for the proper cylinder 114a-114d effective area and the appropriate motor 146a-146d speed for the corresponding drive units 144a-144d. The speed of the motors 146a-146d must be configured based on the hydraulic cylinders 114a-114d being used to ensure that the lock nuts 136a-136d rotate in correspondence to axial movement of the plungers 116a-116d to maintain the spacing of the lock nuts 136a-136d relative to the hydraulic cylinders 114a-114d within the desired range, as previously described.

Next, the operator selects switch 206 to place the synchronous system in "SETUP" mode. Then, the operator prepares the individual systems 110a-110d to engage the load 102, or "snug" the individual systems 110a-110d to the load 102. To do so, the operator depresses and holds the "UP" button 208. As the operator depresses and holds the "UP" button 208, the system 100 snugs the individual systems 110a-110d to the load 102 by selectively supplying hydraulic fluid under pressure to each cylinder 114a-114d. The system 100 determines that each individual system 110a-110d is snug to the load 102 when a specified pressure is reached for each cylinder 114a-114d. The specified pressure will be set at a pressure which is below the pressure necessary to lift the load 102. As seen in FIG. 5, the contact between each individual system 110a-110d and the load 102 may be between a load support 131a-131d and the load 102. It will be appreciated that each plunger 116a-116d may extend different axial lengths before contacting the load 102.

To lift the load 102, the operator then selects switch 206 to "SYNCH" mode and then depresses and holds the "UP" button 208. Before lifting the load 102, however, the synchronous system 100 first checks for a pre-load pressure for each individual system 110a-110d to ensure that each individual system 110a-110d is in contact with the load 102. To do so, the individual hydraulic cylinder position sensing and locking systems 110a-110d may include a pressure sensor (not shown) that communicates to the controller 58.

After validating each individual system 110a-110d is in contact with the load 102, the synchronous lifting may begin. As long as the operator depresses and holds the "UP" button 208, the controller 58 performs a synchronous lift as described in detail above, maintaining the desired tolerance of the axial position of each plunger 116a-116d with respect to the other plungers 116a-116d and maintaining the spacing of each lock nut 136a-136d and the corresponding hydraulic cylinder 114a-114d within the desired range.

At any point during the lift, the operator may stop the lift by releasing the "UP" button 208. As previously described, the controller 58 may be programmed such that the drive units 144a-144d continue to rotate the corresponding lock nuts 136a-136d such that the lock nuts 136a-136d seat against retraction of the plungers 116a-116d into the hydraulic cylinders 114a-114d.

If the operator wants to continue to lift the load 102, the operator may again depress and hold the "UP" button 208. Once the load 102 has reached the proper lift height, the operator may then release the "UP" button 208, and the lock nuts 136a-136d will be turned down by the corresponding drive units 144a-144d to seat against retraction of the plungers 116a-116d, thus locking the synchronous system 100.

If the operator so desires, the operator may disconnect the hydraulic hoses from the individual systems 110a-110d by first depressing the "Hose Disconnect" button 212. The synchronous system 100 will verify through the distance sensors 156a-156d that the lock nuts 136a-136d are seated against retraction of the plungers 116a-116d into their corresponding hydraulic cylinders 114a-114d before relieving pressure to the hydraulic system. The electrical wires may also be disconnected, thus allowing the operator to use the wires and hoses for another application.

To lower a load 102, the operator performs the following sequence of operations. First, the operator provides power to the synchronous system 100 from the power source 59. Then the operator may turn on the pump 21 for the synchronous system 100 by turning switch 202 to "ON," however, the pump 21 may not be necessary for lowering the load 102, and in such a case, the operator need not turn switch 202 to "ON." At this point, the controller 58 validates electrical communication with the hydraulic fluid source 19 and pump 21, as well as the drive units 144a-144d, the distance sensors 156a-156d, the rotary position sensors 160a-160d, and the control valves 125a-125d for each of the individual hydraulic position sensing and locking systems 110a-110d. When this validation is complete, the "READY" indicator 216 lights up.

The operator then selects switch 204 to appropriately configure the system 100 to lower the load 102, either selecting "LOAD 1" or "LOAD 2," depending on the characteristics of the load currently being supported by the system 100.

Once the appropriate load is selected by switch 204, the synchronous system 100 configures for the proper cylinder effective area and the appropriate motor 146a-146d speed for the corresponding drive units 144a-144d. As described above with respect to lifting the load 102, the speed of the motors 146a-146d must be configured based on the hydraulic cylinders 114a-114d being used to ensure that the lock nuts 136a-136d are turned up on the plungers 116a-116d in correspondence to axial movement of the plungers 116a-116d in the retraction direction 26 to maintain the spacing of the lock nuts 136a-136d relative to the hydraulic cylinders 114a-114d within the desired range, as previously described.

Next, the operator selects switch 206 to "SYNCH" mode. The synchronous system 100 defines the lowering plane to determine how far to axially lower each plunger 116a-116d.

To begin the synchronous lowering process, the operator depresses the "DOWN" button 214. Before the load 102 lowers, however, the controller 58 may be programmed to provide hydraulic fluid under pressure to the hydraulic cylinders 114a-114d to relieve any friction on the lock nuts 136a-136d that may prohibit rotating of the lock nuts 136a-136d to be turned up on the plungers 116a-116d as the plungers 116a-116d are lowered into their corresponding hydraulic cylinders 114a-114d. After releasing the friction from the lock nuts 136a-136d, the system 100 is now ready to synchronously lower the load 102.

As the operator continues to depress the "DOWN" button 214 on the pendant 200, the system 100 lowers the load 102 in a synchronous fashion. Just as previously described, the controller 58 is programmed to synchronously lower the load 102 by maintaining the desired tolerance between the axial position of each of the plungers 116a-116d with respect to the other plungers 116a-116d as well as to maintain the spacing between each lock nut 136a-136d and the corresponding hydraulic cylinder 114a-114d within the desired range.

If the operator releases the "DOWN" button 214 during any point of the lowering process, the system 100 will stop lowering the load 102 and the drive units 144a-144d will turn down the corresponding lock nuts 136a-136d on the plungers 116a-116d such that the lock nuts 136a-136d are seated against retraction of the plungers 116a-116d into the hydraulic cylinders 114a-114d. To continue lowering the load 102, the operator depresses buttons 214, 210 again. As just described, before the system 100 will begin to lower the load 102, hydraulic fluid under pressure may be supplied to the hydraulic cylinders 114a-114d to relieve any friction on the lock nuts 136a-136d that may prohibit rotating of the lock nuts 136a-136d to be turned up on the plungers 116a-116d that occurs as the load 102 is lowered.

Once the load 102 is lowered to the desired level, or plane, the operator may then release the "DOWN" button 214. Depending on the shape of the load 102 and the set-up of the individual systems 110a-110d, the load 102 may be lowered such that the load 102 supports itself before one or more of the plungers 116a-116d have fully retracted into their corresponding hydraulic cylinders 114a-114d. For example, the load 102 may be a vehicle which has tires that may contact the ground before full retraction of the plungers 116a-116d. In that situation, the vehicle will support itself before full retraction of the plungers 116a-116d into their corresponding hydraulic cylinders 114a-114d.

In any event, once the load 102 is lowered to the desired level and the operator has released the "DOWN" button 214, the operator selects switch 206 to place the synchronous system 100 in "SETUP" mode. The system 100 checks for pressure on the individual systems 110a-110d, as described above. If no pressure is detected, the "READY" indicator 216 lights on the pendant 200. The operator may then depress the "DOWN" button 214 and the drive units 144a-144d will turn up the lock-nuts 136a-136d on the plungers 116a-116d to allow the plungers 116a-116d to retract into their corresponding hydraulic cylinders 114a-114d.

As seen in FIG. 6, the pendant 200 also includes a "SAFETY" button 210. The "SAFETY" button 210 may be used by an operator during lifting or lowering of the load 102 to override the synchronous feature of the system 100. When using this feature, the operator must depress and hold both the "SAFETY" button 210 as well as either the "UP" button 208 or the "DOWN" button 214. The load 102 will be lifted or lowered by increasing or decreasing the hydraulic fluid under pressure to each control valve 125a-125d, but without the controller 58 maintaining the axial position of each plunger 116a-116d to remain within a desired tolerance of the axial position of the other plungers 116a-116d.

Also seen in FIG. 6, the pendant also includes an "E-STOP" button 218, and an "ALARM" indicator 220. The "E-STOP" button 218 may be depressed by the operator during either lifting or lowering a load 102 to provide an emergency stop mechanism. The "ALARM" indicator 220 may light up if the synchronous system is unable to properly validate any of the sensor equipment before lifting or lowering a load 102, or to detect a problem that may prevent proper operation of the synchronous system 100. When the "ALARM" indicator 220 lights, the "READY" indicator 216 no longer remains lit. Thus, either the "READY" or "ALARM" indicators 216, 220 are lit during the operation of the synchronous system 100.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A hydraulic cylinder position sensing and locking system, comprising:
    a hydraulic actuator including:
    a hydraulic cylinder; and
    a plunger including a piston in the hydraulic cylinder and a threaded rod that extends axially from so as to move with the piston, the plunger being moveable axially relative to the cylinder in an extension direction and a retraction direction by selective supply of hydraulic fluid under pressure to the hydraulic cylinder;
    a lock nut that rotatably engages the threaded rod with a threaded connection therebetween;
    a drive unit that can be operated to rotate the lock nut relative to the plunger;
    a distance sensor that outputs a distance signal that is indicative of the axial spacing of the lock nut relative to the hydraulic cylinder;
    a rotary position sensor that provides a signal indicative of rotary position of the drive unit; and wherein the system determines the axial position of the plunger at least in part from the rotary position sensor signal, and
    a controller that receives as an input the distance signal and outputs a control signal to control the drive unit so as to turn the lock nut in correspondence with the axial movement of the plunger so as to maintain the spacing of the lock nut relative to the hydraulic cylinder within a desired range.

2. The hydraulic cylinder position sensing and locking system of claim 1, wherein the system determines the axial position of the plunger at least in part from the distance signal.

3. The hydraulic cylinder position sensing and locking system of claim 1, wherein the system determines the axial position of the piston at least in part from the distance signal.

4. The hydraulic cylinder position sensing and locking system of claim 1, wherein there is at least an additional hydraulic actuator and corresponding lock nut, drive unit, and distance sensor as claimed in claim 1, and wherein each hydraulic actuator, drive unit, and distance sensor is connected to the controller and the controller determines the axial position of the plunger of each hydraulic actuator at least in part from a rotary position sensor signal output by the rotary position sensor of the corresponding hydraulic actuator and wherein the hydraulic actuators are operated in synchronization by the controller.

5. The hydraulic cylinder position sensing and locking system of claim 1, wherein the desired range of the spacing of the lock nut relative to the hydraulic cylinder is about one millimeter to about six millimeters.

6. A method of locking and sensing the position of a hydraulic cylinder comprising the steps of:
    providing a hydraulic actuator that includes: a hydraulic cylinder, and
    a plunger including a piston in the hydraulic cylinder and a threaded rod that extends axially from the piston so as to move with the piston, the plunger being moveable axially relative to the cylinder in an extension direction and a retraction direction by selective supply of hydraulic fluid under pressure to the hydraulic cylinder;
    providing a lock nut that rotatably engages the threaded rod with a threaded connection therebetween;
    providing a drive unit that can be operated to rotate the lock nut relative to the plunger;
    providing a distance sensor that outputs a distance signal that is indicative of the axial spacing of the lock nut relative to the hydraulic cylinder;
    providing a controller that receives as an input the distance signal and outputs a control signal to control the drive unit;
    programming the controller to provide the signal to control the drive unit such that the drive unit turns the lock nut in correspondence with the axial movement of the plunger so as to maintain the spacing of the lock nut relative to the hydraulic cylinder within a desired range, and programming the controller such that before rotating the lock nut to unseat the lock nut, hydraulic fluid under pressure is introduced to the hydraulic cylinder to relieve friction on the lock nut that may prohibit rotating of the lock nut.

7. The method of locking and sensing the position of a hydraulic cylinder of claim 6, the method further comprising the steps of:

providing a rotary position sensor configured to provide a signal to the controller indicative of rotary position of the drive unit; and programming the controller to determine the axial position of the plunger at least in part from the rotary position sensor signal.

8. The method of locking and sensing the position of a hydraulic cylinder of claim 7, further comprising the step of:

programming the controller to determine the axial position of the plunger at least in part from the distance signal.

9. The method of locking and sensing the position of a hydraulic cylinder of claim 6, further comprising the step of:

programming the controller to determine the axial position of the plunger at least in part from the distance signal.

10. The method of locking and sensing the position of a hydraulic cylinder of claim 6, wherein the desired range of the spacing of the lock nut relative to the hydraulic cylinder is about one millimeter to about six millimeters.

11. The method of locking and sensing the position of a hydraulic cylinder of claim 6, further comprising the step of:

programming the controller such that upon a stoppage of movement of the plunger, the controller provides a signal to the drive unit such that the drive unit continues to turn the lock nut such that the lock nut seats against retraction of the plunger.

12. The method of locking and sensing the position of a hydraulic cylinder of claim 6, further comprising the step of:

programming the controller such that upon a stoppage of movement of the plunger, the controller provides a signal to the drive unit such that the drive unit turns the lock nut such that the lock nut is spaced a distance from the hydraulic cylinder, and the controller selectively supplies hydraulic fluid under pressure to the hydraulic cylinder to lower the plunger such that the lock nut seats against retraction of the plunger.

13. The method of locking and sensing the position of a hydraulic cylinder of claim 6, further comprising the step of:

programming the controller such that prior to any movement of the plunger in the retraction direction, the controller provides a signal to the drive unit such that the drive unit turns the lock nut such that the lock nut moves out of being seated against retraction of the plunger.

14. The method of locking and sensing the position of a hydraulic cylinder of claim 6, wherein the drive unit includes a motor, a gear reduction unit, and a drive gear with teeth, and gear teeth on the lock nut, wherein the teeth on the drive gear mesh with gear teeth on the lock nut.

15. A synchronous hydraulic cylinder position sensing and locking system, comprising:

at least two hydraulic actuators, each hydraulic actuator including:

a hydraulic cylinder, and a plunger including a piston in the hydraulic cylinder and a threaded rod that extends axially from so as to move with the piston, the plunger being moveable axial ly relative to the cylinder in an extension direction and a retraction direction by selective supply of hydraulic fluid under pressure to the hydraulic cylinder;

a corresponding lock nut for each hydraulic actuator that rotatably engages the threaded rod with a threaded connection therebetween;

a corresponding drive unit for each hydraulic actuator that can be operated to rotate the lock nut relative to the plunger;

a corresponding distance sensor for each hydraulic actuator that outputs a distance signal that is indicative of the axial spacing of the lock nut relative to the hydraulic cylinder; a corresponding rotary position sensor for each hydraulic actuator that provides a signal indicative of rotary position of the drive unit, and a controller that receives the signal from the rotary position sensor of each hydraulic actuator to determine the axial position of the plunger of each hydraulic actuator at least in part from the rotary position sensor signal, maintains the difference between the axial positions of the plungers within a desired tolerance by selectively controlling the supply of hydraulic fluid under pressure that flows to each hydraulic cylinder, and receives as an input the distance signal of each distance sensor and outputs a control signal to control the corresponding drive units such that each drive unit turns the corresponding lock nut in correspondence with the axial movement of the corresponding plunger of each hydraulic actuator so as to maintain the spacing of each lock nut relative to the corresponding hydraulic cylinder within a desired range.

16. The synchronous hydraulic cylinder position sensing and locking system of claim 15 wherein the controller determines the axial position of the plunger of each hydraulic actuator at least in part from the distance signal.

17. The synchronous hydraulic cylinder position sensing and locking system of claim 15 wherein the desired range of the spacing of each lock nut relative to the corresponding hydraulic cylinder is about one millimeter to about six millimeters.

18. The synchronous hydraulic cylinder position sensing and locking system of claim 15 wherein upon a stoppage of movement of the plungers, each drive unit continues to turn the corresponding lock nut such that each lock nut seats against retraction of the corresponding plunger.

19. The synchronous hydraulic cylinder position sensing and locking system of claim 15 wherein upon a stoppage of movement of the plungers in the extension direction, the controller determines the length of extension of the plunger of each hydraulic actuator from an initial position to a stopping position, the controller outputs a control signal to the corresponding drive unit of the hydraulic actuator with the plunger that extended the least relative to the other plungers such that the corresponding drive unit turns the lock nut such that the spacing of the lock nut relative to the hydraulic cylinder is a certain distance, the controller outputs a control signal to the other drive units such that the other drive units turn the corresponding lock nuts such that the spacing of each lock nut relative to the corresponding hydraulic cylinder is adjusted to compensate for any difference in the extension of the plungers relative to the plunger that extended the least, and the controller selectively supplies hydraulic fluid under pressure to the hydraulic cylinder of each hydraulic actuator to lower each of the plungers such that each lock nut seats against retraction of the corresponding plunger.

20. The synchronous hydraulic cylinder position sensing and locking system of claim 15 wherein upon a stoppage of movement of the plungers in the retraction direction, the controller determines the length of retraction of the plunger of each hydraulic actuator from an initial position to a stopping position, the controller outputs a control signal to the corresponding drive unit of the hydraulic actuator with the plunger that extended the most relative to the other plungers such that the corresponding drive unit turns the lock nut such that the spacing of the lock nut relative to the hydraulic cylinder is a certain distance, the controller outputs a control signal to the other drive units such that the other drive units turn the corresponding lock nuts such that the spacing of each lock nut relative to the corresponding hydraulic cylinder is set to compensate for any difference in the length of retraction of the other plungers relative to the plunger that retracted the most, and the controller selectively supplies hydraulic fluid under pressure to the hydraulic cylinder of each hydraulic actuator to lower each of the plungers such that each lock nut seats against retraction of the corresponding plunger.

21. The synchronous hydraulic cylinder position sensing and locking system of claim 15 wherein prior to any movement of the plungers in the retraction direction, each drive unit turns the corresponding lock nut such that the lock nuts move out of being seated against retraction of the corresponding plungers.

22. The synchronous hydraulic cylinder position sensing and locking system of claim 15 wherein the drive unit includes:
a motor;
a gear reduction unit;
a drive gear with teeth; and
gear teeth on the lock nut;
wherein the teeth on the drive gear mesh with the gear teeth on the lock nut.

23. The synchronous hydraulic cylinder position sensing and locking system of claim 15 wherein before rotating the lock nuts to unseat the lock nuts, hydraulic fluid under pressure is introduced to each of the hydraulic cylinders to relieve friction on the lock nuts that may prohibit rotating of the lock nuts.

24. A method of synchronously lifting or lowering a load with hydraulic cylinders comprising the steps of: providing at least two hydraulic actuators that each include:
a hydraulic cylinder, and
a plunger including a piston in the hydraulic cylinder and a threaded rod that extends axially from the piston so as to move with the piston, the plunger being moveable axially relative to the cylinder in an extension direction and a retraction direction by selective supply of hydraulic fluid under pressure to the hydraulic cylinder;
providing a corresponding lock nut for each hydraulic actuator that rotatably engages the threaded rod with a threaded connection therebetween;
providing a corresponding drive unit for each hydraulic actuator that can be operated to rotate the lock nut relative to the plunger;
providing a corresponding distance sensor for each hydraulic actuator that outputs a distance signal that is indicative of the axial spacing of the lock nut relative to the hydraulic cylinder;
providing a corresponding rotary position sensor for each hydraulic actuator that provides a signal indicative of rotary position of the drive unit;
providing a controller that receives as an input the distance signal of each distance sensor and receives the rotary position sensor signal;
programming the controller to:
determine the axial position of the plunger of each hydraulic actuator at least in part from the corresponding rotary position sensor signal,
maintain the difference between the axial position of each plunger of the hydraulic actuators to stay within a desired tolerance by selectively controlling the supply of hydraulic fluid under pressure that flows to each hydraulic cylinder; and
output a signal to each drive unit to turn the corresponding lock nut in correspondence with axial movement of the corresponding plunger so as to maintain the spacing of the lock nut relative to the corresponding hydraulic cylinder within a desired range; and
operating the controller to synchronously lift or lower the load.

25. The method of synchronously lifting or lowering a load with hydraulic cylinders of claim 24, wherein the controller is further programmed to determine the axial position of the plunger of each hydraulic actuator at least in part from the corresponding distance signal.

26. The method of synchronously lifting or lowering a load with hydraulic cylinders of claim 24, wherein the desired range of the spacing of each lock nut relative to the corresponding hydraulic cylinder is about one millimeter to about six millimeters.

27. The method of synchronously lifting or lowering a load with hydraulic cylinders of claim 24, further comprising the step of:
programming the controller such that upon a stoppage of movement of all of the plungers, the controller provides a signal to the drive units such that the drive units continue to turn the corresponding lock nuts such that the lock nuts seat against retraction of the corresponding plungers.

28. The method of synchronously lifting or lowering a load with hydraulic cylinders of claim 24, further comprising the step of:
programming the controller such that upon a stoppage of movement of the plungers in the extension direction, the controller determines the length of extension of the plunger of each hydraulic actuator from an initial position to a stopping position, the controller outputs a control signal to the corresponding drive unit of the hydraulic actuator with the plunger that extended the least relative to the other plungers such that the corresponding drive unit turns the lock nut such that the spacing of the lock nut relative to the hydraulic cylinder is a certain distance, the controller outputs a control signal to the other drive units such that the other drive units turn the corresponding lock nuts such that the spacing of each lock nut relative to the corresponding hydraulic cylinder is adjusted to compensate for any difference in the extension of the plungers relative to the plunger that extended the least, and the controller selectively supplies hydraulic fluid under pressure to the hydraulic cylinder of each hydraulic actuator to lower each of the plungers such that each lock nut seats against retraction of the corresponding plunger.

29. The method of synchronously lifting or lowering a load with hydraulic cylinders of claim 24, further comprising the step of:

programming the controller such that upon a stoppage of movement of the plungers in the retraction direction, the controller determines the length of retraction of the plunger of each hydraulic actuator from an initial position to a stopping position, the controller outputs a control signal to the corresponding drive unit of the hydraulic actuator with the plunger that extended the most relative to the other plungers such that the corresponding drive unit turns the lock nut such that the spacing of the lock nut relative to the hydraulic cylinder is a certain distance, the controller outputs a control signal to the other drive units such that the other drive units turn the corresponding lock nuts such that the spacing of each lock nut relative to the corresponding hydraulic cylinder is set to compensate for any difference in the length of retraction of the other plungers relative to the plunger that retracted the most, and the controller selectively supplies hydraulic fluid under pressure to the hydraulic cylinder of each hydraulic actuator to lower each of the plungers such that each lock nut seats against retraction of the corresponding plunger.

30. The method of synchronously lifting or lowering a load with hydraulic cylinders of claim 24, further comprising the step of:

programming the controller such that prior to any movement of a plunger in the retraction direction, the controller provides a signal to the corresponding drive unit such that the drive unit turns the corresponding lock nut such that the lock nut moves out being seated against retraction of the plunger.

31. The method of synchronously lifting or lowering a load with hydraulic cylinders of claim 24, wherein each drive unit includes a motor, a gear reduction unit, a drive gear with teeth, and gear teeth on the lock nut, wherein the teeth on the drive gear mesh with the gear teeth on the lock nut.

32. The method of synchronously lifting or lowering a load with hydraulic cylinders of claim 24, further comprising the step of:

programming the controller such that before rotating the lock nuts to unseat the lock nuts, hydraulic fluid under pressure is introduced to each of the hydraulic cylinders to relieve friction on the lock nuts.

* * * * *